US011969116B2

(12) United States Patent
Parolini et al.

(10) Patent No.: US 11,969,116 B2
(45) Date of Patent: Apr. 30, 2024

(54) APPARATUS FOR MEASURING OPERATING PARAMETERS OF ESPRESSO COFFEE MACHINES

(71) Applicant: DVG DE VECCHI S.R.L., Cornate d'Adda (IT)

(72) Inventors: Daniele Parolini, Capriate San Gervasio (IT); Mario Conti, Lierna (IT); Luigi Villanueva, Cornate d'Adda (IT)

(73) Assignee: DVG DE VECCHI SRL, Cornate d'Adda (IT)

( * ) Notice: Subject to any disclaimer, the term of this patent is extended or adjusted under 35 U.S.C. 154(b) by 616 days.

(21) Appl. No.: 17/256,099

(22) PCT Filed: Jul. 1, 2019

(86) PCT No.: PCT/IB2019/055589
§ 371 (c)(1),
(2) Date: Dec. 24, 2020

(87) PCT Pub. No.: WO2020/012291
PCT Pub. Date: Jan. 16, 2020

(65) Prior Publication Data
US 2021/0267409 A1    Sep. 2, 2021

(30) Foreign Application Priority Data
Jul. 9, 2018  (IT) .................. 102018000007032

(51) Int. Cl.
*A47J 31/52*    (2006.01)
*A47J 31/06*    (2006.01)
(Continued)

(52) U.S. Cl.
CPC ....... *A47J 31/5253* (2018.08); *A47J 31/0621* (2013.01); *A47J 31/0663* (2013.01);
(Continued)

(58) Field of Classification Search
CPC ............... A47J 31/5253; A47J 31/5251; A47J 31/0621; A47J 31/0663; A47J 2202/00;
(Continued)

(56) References Cited

FOREIGN PATENT DOCUMENTS

| EP | 2314183 A1 | 4/2011 |
|----|------------|--------|
| EP | 3054822 A1 | 8/2016 |
| WO | 9819584 A1 | 5/1998 |

OTHER PUBLICATIONS

International Search Report and Written Opinion dated Sep. 9, 2019 from counterpart International Patent Application No. PCT/IB2019/055589.

*Primary Examiner* — Anthony J Weier
(74) *Attorney, Agent, or Firm* — SHUTTLEWORTH & INGERSOLL, PLC; Timothy J. Klima

(57) ABSTRACT

Apparatus for measuring the operating parameters of espresso coffee machines, including: a filter-holder body configured to be associated with a water dispensing nozzle of an espresso coffee machine; said body internally defining a chamber for the passage of the water dispensed by said nozzle; a filling element arranged in said chamber and having a cavity for the passage of the water dispensed by the nozzle towards an outlet duct; a water outlet terminal element associated with said filter-holder body downstream of said chamber and defining said water outlet duct; and reading means for the water pressure and temperature values passing from the chamber to the outlet duct; said reading means include at least one pressure reading device operatively engaged with said water outlet terminal element and at least one temperature reading device operatively engaged at said cavity obtained in the filling element.

11 Claims, 5 Drawing Sheets

(51) Int. Cl.
*G01K 13/02* (2021.01)
*G01L 19/00* (2006.01)
*G01L 19/16* (2006.01)

(52) U.S. Cl.
CPC ........ *A47J 31/5251* (2018.08); *G01K 13/026* (2021.01); *G01L 19/0007* (2013.01); *G01L 19/16* (2013.01); *A47J 2202/00* (2013.01); *G01K 2207/06* (2013.01)

(58) Field of Classification Search
CPC .............. G01K 13/026; G01K 2207/06; G01L 19/0007; G01L 19/16
USPC ........................................................ 426/231
See application file for complete search history.

APPARATUS FOR MEASURING OPERATING PARAMETERS OF ESPRESSO COFFEE MACHINES

This application is the National Phase of International Application PCT/IB2019/055589 filed Jul. 1, 2019 which designated the U.S.

This application claims priority to Italian Patent Application No. 102018000007032 filed Jul. 9, 2018, which application is incorporated by reference herein.

BACKGROUND OF THE INVENTION

The present invention relates to an apparatus for measuring the operating parameters of espresso coffee machines.

In particular, the present invention relates to an apparatus, and relative method, for monitoring the water temperature and pressure values dispensed by the machine for producing espresso coffee.

As is known, espresso coffee machines are adjusted in their main operating parameters, typically the dispensing temperature and pressure of water which is leachate through the coffee powder.

These parameters significantly affect the quality of the final product (espresso coffee) and for this reason, before normal operation, the machines undergo an appropriate adjustment by means of measuring devices designed to detect the aforementioned pressure and temperature values during the dispensing phase.

In this way, depending on the values detected by the measuring device, the operator provides for the calibration of the machine by directly correcting the machine's operating elements which affect the water pressure and temperature.

This measurement and simultaneous manual adjustment method is carried out for each water dispensing spout in an espresso coffee machine and is set up for coupling with a filter-holder member.

For this purpose, the known type measuring devices consist of systems made in the form of a filter holder, to which the appropriate sensors for detecting the operating parameters are integrated.

In particular, a pressure gauge is provided, in fluid communication with the leaching chamber of the filter-holder to detect the water pressure in the dispensing phase.

The pressure gauge also has a dial, arranged on the handle of the filter-holder to be easily readable by the operator.

A thermometer is also provided with a probe inserted along the water passage channel. The thermometer is made in the form of a digital reader to inform the user of the temperature detected.

In this way, by applying the measuring device (filter-holder) on the coffee machine, it is operated to directly detect temperature and pressure.

The operator then sets the machine until the desired temperature and pressure values are obtained.

Once the adjustment is completed, repeated for each dispensing spout of the machine, the machine is placed in the optimal operating condition.

The known type measuring devices described above, although capable of providing a measurement of the water pressure and temperature during the coffee machine setting phase, have some drawbacks and can be improved in several respects.

A first important drawback of known measurement systems is given by the wide margin of error with which the temperature and pressure values which affect the quality of the espresso coffee are detected.

It should be noted in fact that, especially as regards the temperature reading phase, the sensor probe is positioned along the water duct, before the leaching chamber and therefore upstream of the area wherein the water leaches inside the coffee powder.

Consequently, is detected the temperature at the outlet of the nozzle and not the temperature at which the beverage is obtained, which affects the organoleptic features of the finished product.

In this regard it should be specified that during the passage of water from the machine dispensing nozzle to the leaching chamber, a drop in temperature is detected.

Therefore, the temperature reading of the water upstream of the chamber is higher than the actual temperature value in the infusion phase.

In this context, it should also be considered that the positioning of the probe inside the containing chamber of the coffee powder is particularly inconvenient and therefore difficult to implement.

Furthermore, the possible contact of the probe with the steel walls of the filter-holder could distort the correct reading of the temperature value.

In addition to the above, also for the detection of the pressure value there is an important drawback always derived from the positioning of the pressure gauge.

In fact, the pressure gauge positioned at the leaching chamber and integrated with the handle is subject to external vibrations and to the entrance of impurities present in the chamber itself.

In this situation, even the detection of the pressure value can be distorted by these factors, indicating a non-real pressure value in the coffee extraction phase.

A further important drawback of the known devices is given by the structural complexity of the filter-holder which integrates the water value reading systems.

This complexity significantly affects the maintenance operations of the device itself, which therefore does not allow it to be disassembled for an accurate internal cleaning of the water passage channels.

It should in fact be pointed out that any residues of coffee powder can insert in the pressure gauge and in the fluid passage sections, interfering with the accurate reading of the aforementioned operating parameters.

In this context, the technical task underlying the present invention is to propose an apparatus for measuring operating parameters of the espresso coffee machines, which overcomes the drawbacks of the aforementioned known technique.

BRIEF SUMMARY OF THE INVENTION

In particular, it is an object of the present invention to provide an apparatus that is capable of detecting water pressure and temperature values in an extremely accurate manner.

In greater detail, it is an object of the present invention to provide an apparatus, and a relative method, which is capable of directly and constantly detecting the real water temperature and pressure values during the coffee extraction phase.

A further object of the present invention is to propose an apparatus which is simple both from the structural point of view and for the respective use in the setting up of an espresso coffee machine.

Finally, another object of the present invention is to provide an apparatus that can be easily disassembled to carry out maintenance and cleaning operations aimed at eliminating any reading error of the pressure and temperature values derived precisely from the presence of impurities inside the water passage channels.

The outlined technical task and the specified object are basically achieved by an apparatus for measuring the operating parameters of the espresso coffee machines, comprising the technical features set put in one or more of the appended claims.

BRIEF DESCRIPTION OF THE SEVERAL VIEWS OF THE DRAWINGS

Further features and advantages of the present invention will become more apparent from the indicative description, and therefore not limiting, of a preferred but not exclusive embodiment of an apparatus for measuring the operating parameters of the espresso coffee machines as illustrated in the appended drawing wherein.

DETAILED DESCRIPTION OF THE INVENTION

Figure 1:
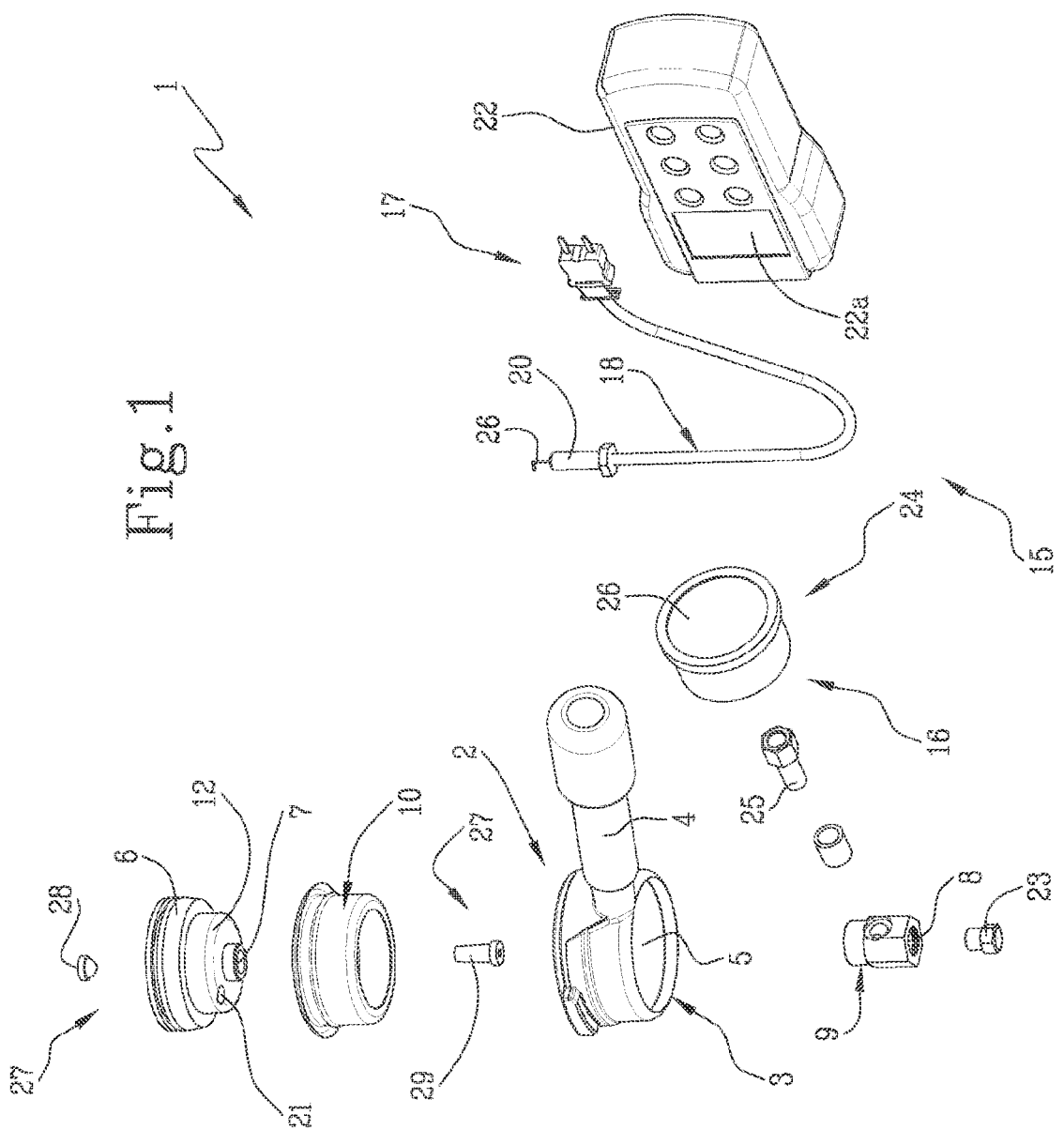
FIG. 1 shows an exploded perspective view of the apparatus for measuring the operating parameters of the espresso coffee machines according to the present invention.

With reference to the appended figures, reference numeral 1 generally indicates an apparatus for measuring the operating parameters of an espresso coffee machine (not illustrated since it is not part of the present invention).

The apparatus 1 comprising a filter-holder body 2 configured to be associated with a water dispensing nozzle of an espresso coffee machine.

In particular, the filter-holder body 2 has a hollow element 3 having a substantially circular section and provided with a grip handle 4 extending transversely from the hollow element 3.

The hollow element 3, which has suitable flanges 3a for coupling to the espresso coffee machine, internally defines a chamber 5 for the passage of the water dispensed by the dispensing nozzle of the machine.

The cup-shaped filter 10 develops inside the entire hollow element 3 to receive a filling element 6 arranged in the chamber 5 and having a cavity 7 for the passage of the water.

The cavity 7 defines a water path from the nozzle and towards an outlet duct 8 obtained inside a water outlet terminal element 9.

Figure 3:
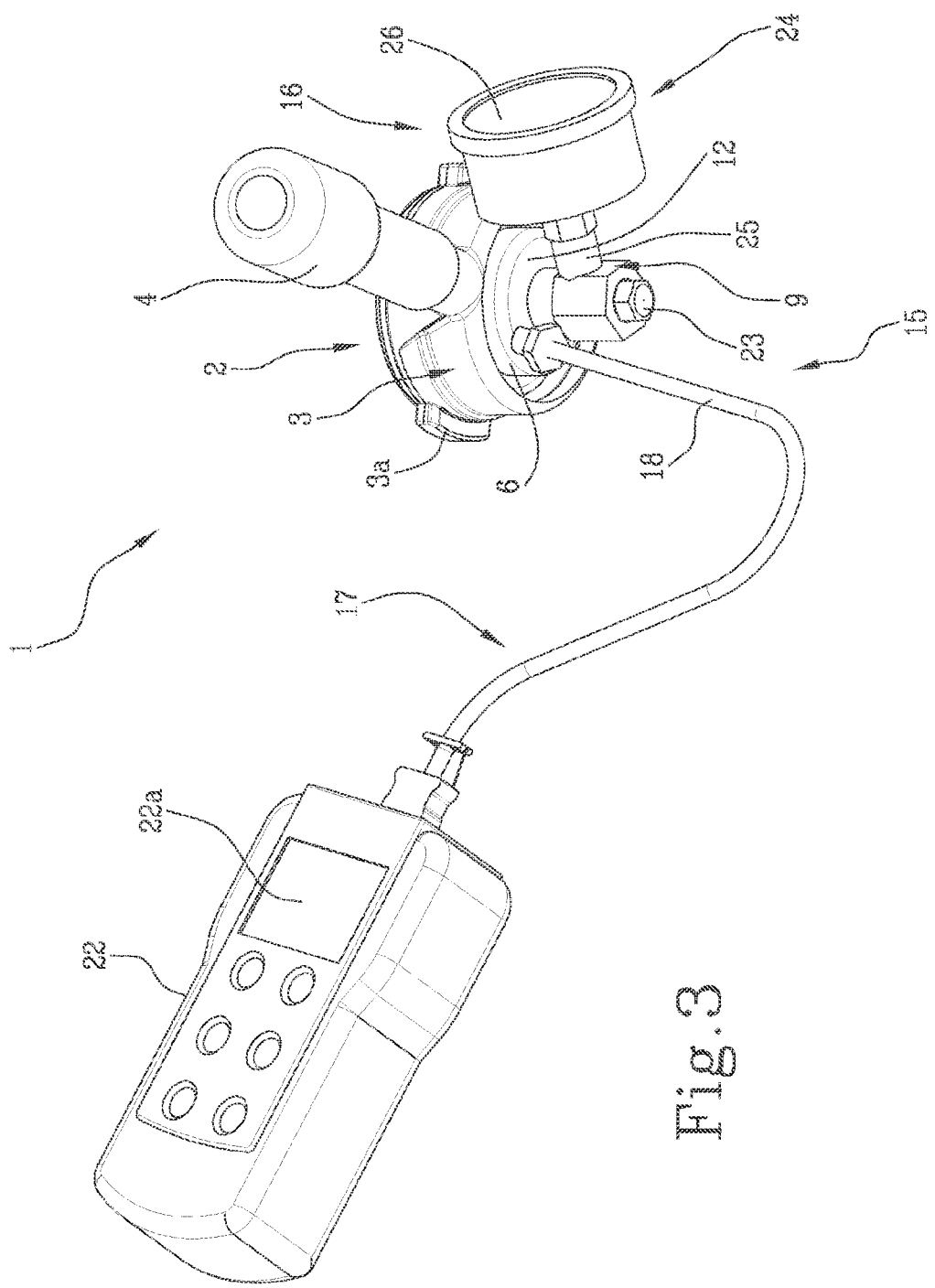
FIG. 3 shows a perspective view from a lower perspective of the apparatus of FIG. 1 in a respective assembled condition.

In greater detail, as better illustrated in FIGS. 1 and 3, the terminal element 9 is engaged with the filter-holder body 2 and in particular with the filling element 6 downstream of the mentioned chamber 5.

Figure 4:
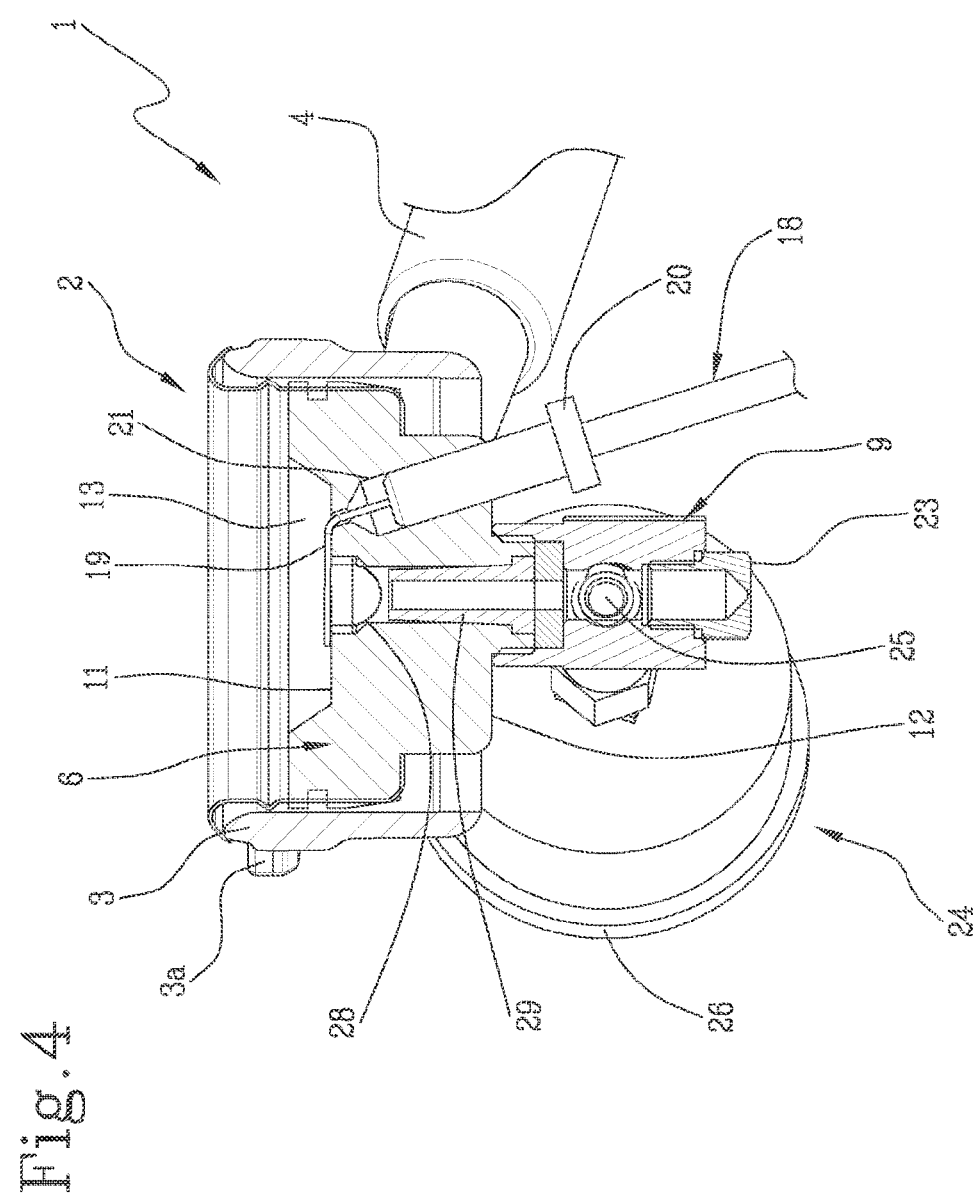
FIG. 4 shows a sectional view along the line A-A of a construction detail of the apparatus of FIG. 2.
Figure 5:
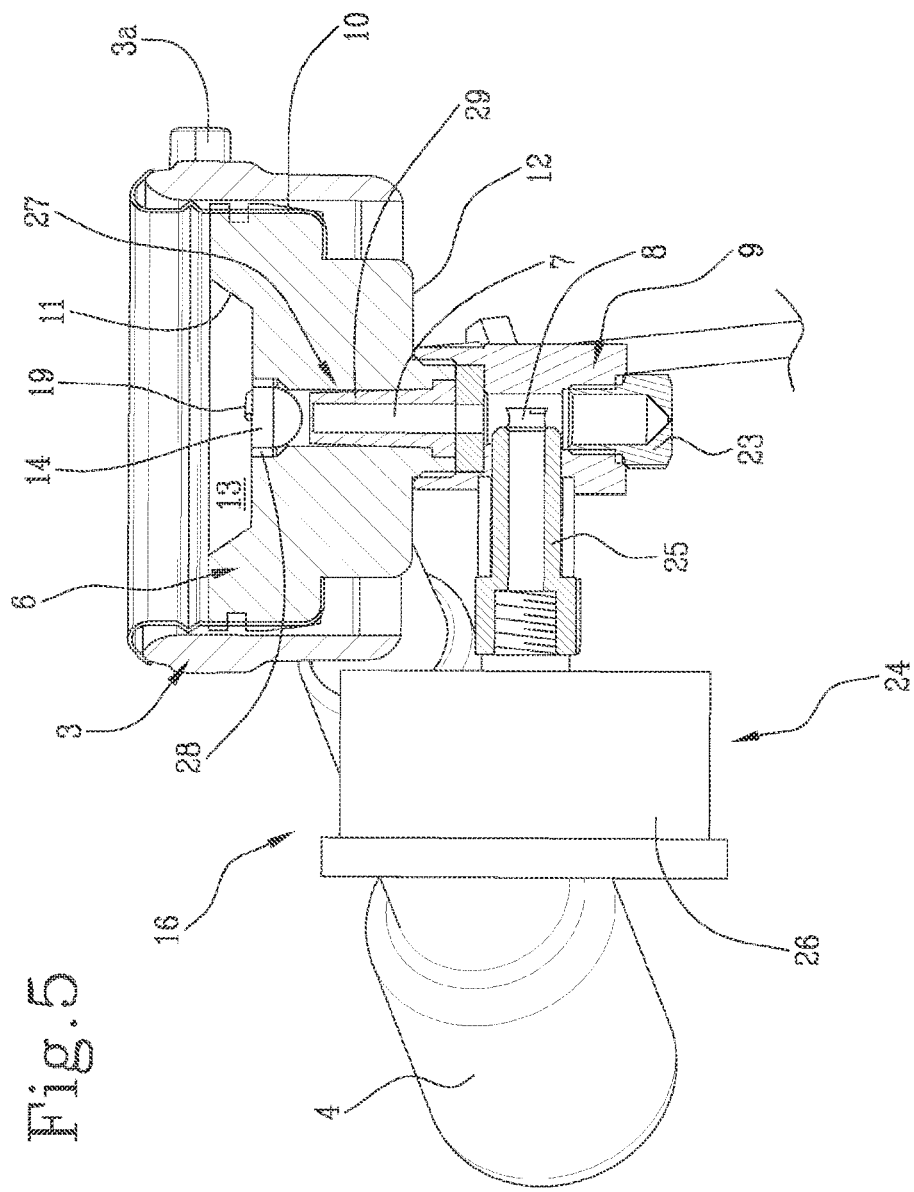
FIG. 5 shows a sectional view of a construction detail of the apparatus of FIG. 2.

As better illustrated in the sectional views of FIGS. 4 and 5, the filling element 6 is constituted by a substantially cylindrical body preferably made of polyoxymethylene and having an upper surface 11 facing the machine dispensing nozzle and a lower surface 12 facing the terminal element 9.

The upper surface 11 has a concave profile to define a stagnation zone 13 of the water dispensed under pressure from the machine.

Moreover, on the upper surface 11 an opening 14 is obtained for accessing the cavity 7 for the passage of the water.

The apparatus 1 further comprises reading means 15 for the pressure and temperature values of the water passing from the chamber 5 to the outlet duct 8.

Advantageously, the reading means 15 comprise at least one pressure reading device 16 operatively engaged to the water outlet terminal element 9 and at least one temperature reading device 17 operatively engaged at the cavity 7 obtained in the filling element 6.

Figure 2:
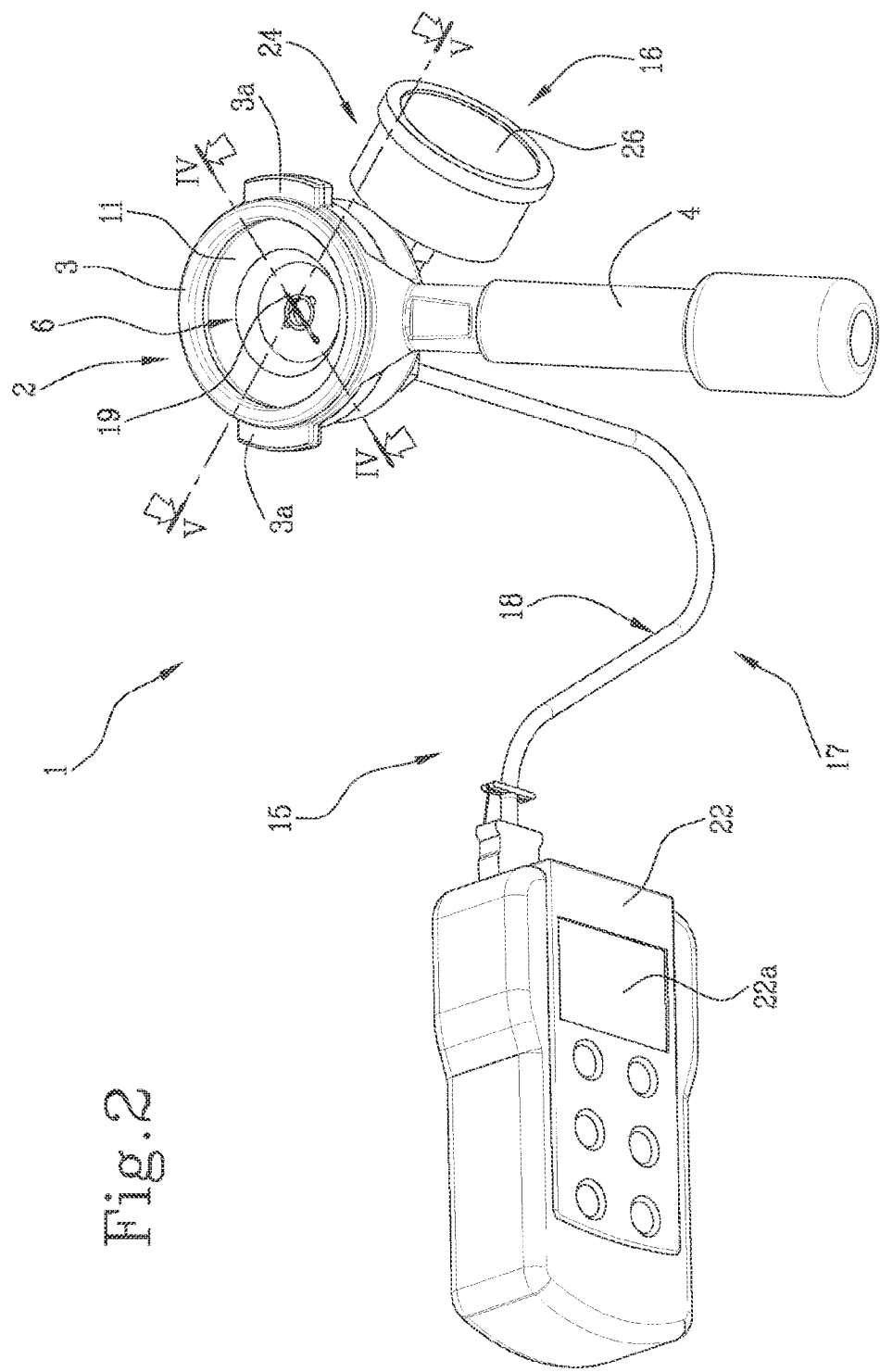
FIG. 2 shows a perspective view from an upper perspective of the apparatus of FIG. 1 in a respective assembled condition.

More particularly, the temperature reading device 17 comprises a thermocouple 18 equipped with a probe 19 extending through the mentioned opening 14 as better illustrated in FIGS. 2 and 4.

It should be noted in particular that the probe 19 is arranged in the water stagnation zone 13 in order to allow a more accurate reading of the temperature of the fluid passing towards the cavity 7 obtained in the filling element 6. The probe 19 preferably has a diameter of 1 mm and a length of about 30 mm.

Preferably, the thermocouple 18 is of the "T" type, with mineral insulation, capable of measuring the temperature within a tenth of a degree.

The thermocouple 18 also has a support element 20 of the probe 19, which acts as an insulated sheath, which can be reversibly engaged inside a through hole 21 obtained in the filling element 6.

In this situation, the through hole 21 develops from the lower surface 12 to the upper surface 11 of the element 6 (FIG. 4).

The support element 20 is in the form of a circular section sleeve to be inserted in the hole 21 positioning the respective probe 19 in the mentioned stagnation zone 13 and near the opening 14.

In order to carry out the cleaning and maintenance operations of the apparatus, the support element 20 can be removed from the hole 21 and removed from the element 6.

The temperature reading device 17 further comprises a digital thermometer 22 engaged with the thermocouple 18 by means of suitable connectors not described in detail since they are of a known type.

The digital thermometer 22 has a display 22a for the constant displaying and mapping of the temperature values.

Moreover, the thermometer 22 provides for the recording of the water temperature values detected in a determined period, as well as comparing them thereto and with respective preset machine operating parameters. The digital thermometer 22 is also configured to be coupled to other types of thermocouples, for example of the "J" or "K" type, making it versatile and usable for different measurement needs.

The outlet terminal element 9 has a substantially cylindrical and internally hollow conformation to define the mentioned water outlet duct 8 coming from the chamber 5. Furthermore, a water flow rate adjuster 23 is preferably provided, arranged at one end of the element 9 opposite to the filter-holder body 2.

The adjuster 23 preferably has a passage hole with a diameter of 0.3 mm to create a water flow resistance.

The dimensions of the passage hole, together with the dimensions of the cavity 7 obtained in the filling element 6, determines an optimal flow rate condition which reproduces the normal operation of the machine during the espresso coffee production phase.

The pressure reading device 16 advantageously comprises a pressure gauge 24 having a connection channel 25 associated in fluid communication with the outlet duct 8 of the terminal 9.

The connection channel 25 extends transversely with respect to the flow direction and is removably engaged to the terminal 9 to allow its removal and to carry out maintenance and total cleaning of the water passage ducts.

The pressure gauge 24 also has a displaying dial 26 of water pressure value in the outlet duct, designed to give a constant indication of such pressure value.

Finally, the apparatus 1 comprises filtering means 27 arranged in the cavity 7 for the passage of the water obtained in the filling element 6.

The filtering means 27 comprise a first reticular element 28 arranged in the opening 14 defining the entrance of water into the cavity 7.

The first reticular element 28, preferably made of stainless steel, has the task of retaining any powdered coffee residue.

The filtering means 27 also comprise a second reticular element 29 arranged downstream of the first element 28, within the cavity 7 and next to the output terminal element 9.

This second reticular element 29 is preferably made of bronze and is configured to retain any impurities smaller than those of the ground coffee that can block the water passageways.

The use of the two reticular elements 28, 29 arranged in series ensures maximum cleaning of the water passage ducts and therefore efficiency of use of the apparatus 1 as well as a long life.

The apparatus 1 described above in a predominantly structural sense, is used according to a process also object of the present invention.

The procedure for measuring the operating parameters of espresso coffee machines, comprising the phases of:
associating the filter-holder body 2 with a water dispensing nozzle of an espresso coffee machine, wherein the body 2 defines internally a chamber 5 for the passage of the water dispensed by the nozzle;
supplying pressurized water through the cavity 7 of passage towards the outlet duct 8;
detecting a water pressure value in the outlet duct 8 during the entire water dispensing phase; and
detecting a water temperature value at the passage cavity 7 obtained in the filling element 6.

In particular, the temperature value detecting phase is carried out by the thermocouple 18 at the water stagnation zone 13, that is to say just within the zone where the water leaches within the coffee powder.

Advantageously, the temperature reading device 17 carries out a very accurate temperature measurement and in a position of real effect on the finished product (espresso coffee).

Such advantage is given both by the type of "T" type thermocouple capable of measuring the temperature within a tenth of a degree, and by the positioning of the probe 19 within the mentioned water stagnation zone 13. Therefore, the temperature that is detected is exactly that of the beverage obtained which affects the organoleptic features of the finished product.

It should also be noted that the positioning of the probe 19 within the chamber 5 is carried out in a simple manner by inserting the probe 19 and the respective support element 20 through the hole 21 obtained in the filling element 6. In this position the probe 19 does not contact any part of the filter-holder body 2 to ensure a correct reading of the temperature value. A further advantage of the present invention is determined by the pressure reading device 16 arranged along the outlet duct 8 of the terminal 9. In this case, the pressure gauge 24 is preserved from the vibrations normally present on the handle, and from the possible entrance of impurities present in the leaching chamber 5.

Therefore, even the detection of the pressure value is carried out in a very accurate manner, giving a real measurement of the water pressure during the coffee extraction phase. Moreover, the presence of the filtering means 27 guarantees the absolute cleanliness within the water passage ducts, retaining any possible impurities in solid form that could interfere with the correct reading of the machine operating parameters. Finally, the apparatus 1 is structurally very simple to carry out the periodic cleaning and maintenance operations. This constructive simplicity allows each component to be disassembled, as shown in FIG. 1, and for cleaning to be carried out on each element for the passage of water.

The invention claimed is:

1. An apparatus for measuring operating parameters of espresso coffee machines, comprising:
a filter-holder body configured to be connected with a water dispensing nozzle of an espresso coffee machine, said filter-holder body internally defining a chamber for passage of water dispensed by said nozzle;
a filling element arranged in said chamber and having a cavity therein for the passage of the water dispensed by the nozzle towards a water outlet duct;
a water outlet terminal element connected with said filter-holder body downstream of said chamber and defining said water outlet duct; and
a reading device configured for reading pressure and temperature values of the water passing from the chamber to the water outlet duct;
the reading device comprising a pressure reading device operatively engaged with said water outlet terminal element and a temperature reading device operatively engaged at said cavity in the filling element;
said temperature reading device comprising a thermocouple having a probe extending through an opening defining an entrance of the cavity in the filling element.

2. The apparatus according to claim 1, wherein said opening is formed on an upper surface of the filling element having a concave profile to define a water stagnation zone inside of which the probe is positioned.

3. The apparatus according to claim 1, wherein said thermocouple is a "T" probe.

4. The apparatus according to claim 1, wherein said temperature reading device comprises a digital thermometer engaged to said thermocouple for displaying, monitoring and recording temperature values of the water detected by the probe.

5. The apparatus according to claim 1, wherein said thermocouple has a support element of the probe, which can be reversibly engaged inside a through hole in said filling element; said through hole extending from a lower surface of the filter-holder body to an upper surface of the filling element.

6. The apparatus according to claim 5, wherein the filling element comprises a substantially cylindrical body made of polyoxymethylene.

7. The apparatus according to claim 1, wherein said water outlet terminal element has a substantially cylindrical and internally hollow shape; said water outlet terminal element having a water flow rate adjuster arranged at an end of the water outlet terminal element opposed to the filter-holder body, to create a water flow resistance.

8. The apparatus according to claim 7, wherein the pressure reading device comprises a pressure gauge having a connection channel in fluid communication with said water outlet duct; said pressure gauge also having a displaying dial for the water pressure value in said water outlet duct.

9. The apparatus according to claim 1, and further comprising a filtering device arranged in said cavity and configured for filter the passage of the water.

10. The apparatus according to claim 9, wherein said filtering device comprises a first reticular element arranged in said opening defining the entrance of water into the cavity; said first reticular element being configured to retain residues of ground coffee.

11. The apparatus according to claim 10, wherein said filtering device comprises a second reticular element arranged in said passage cavity and close to the water outlet terminal element; said second reticular element being configured to retain any impurities smaller than those of ground coffee.

\* \* \* \* \*